(12) United States Patent
Shpunt et al.

(10) Patent No.: US 9,386,299 B2
(45) Date of Patent: Jul. 5, 2016

(54) REFERENCE IMAGE TECHNIQUES FOR THREE-DIMENSIONAL SENSING

(71) Applicant: PrimeSense Ltd., Tel Aviv (IL)

(72) Inventors: Alexander Shpunt, Tel Aviv (IL); Dmitri Rais, Ramat Gan (IL); Niv Galezer, Tel Aviv (IL)

(73) Assignee: APPLE INC., Cupertino, CA (US)

( * ) Notice: Subject to any disclaimer, the term of this patent is extended or adjusted under 35 U.S.C. 154(b) by 71 days.

(21) Appl. No.: 14/301,427

(22) Filed: Jun. 11, 2014

(65) Prior Publication Data

US 2014/0285638 A1 Sep. 25, 2014

Related U.S. Application Data

(62) Division of application No. 12/707,678, filed on Feb. 18, 2010, now Pat. No. 8,786,682.

(60) Provisional application No. 61/157,560, filed on Mar. 5, 2009.

(51) Int. Cl.
*H04N 13/02* (2006.01)
*G01B 11/25* (2006.01)
*G06K 9/20* (2006.01)
*G06T 1/00* (2006.01)
*G06T 7/00* (2006.01)

(52) U.S. Cl.
CPC ........ *H04N 13/0217* (2013.01); *G01B 11/2518* (2013.01); *G01B 11/2545* (2013.01); *G06K 9/2036* (2013.01); *G06T 1/0007* (2013.01); *G06T 7/0057* (2013.01); *H04N 13/0253* (2013.01)

(58) Field of Classification Search
CPC .................................................. G01B 11/2545
See application file for complete search history.

(56) References Cited

U.S. PATENT DOCUMENTS

| | | | | |
|---|---|---|---|---|
| 5,289,261 A | * | 2/1994 | Yogo | G01B 11/2545 250/559.24 |
| 6,700,669 B1 | * | 3/2004 | Geng | G01B 11/2513 356/602 |
| 2007/0057946 A1 | * | 3/2007 | Albeck | G01B 11/2513 345/427 |

* cited by examiner

*Primary Examiner* — Andy Rao
*Assistant Examiner* — Tyler Edwards
(74) *Attorney, Agent, or Firm* — D. Kligler IP Services Ltd.

(57) ABSTRACT

A method including providing a device that projects a pattern of coherent radiation. The method further includes capturing a reference image of the pattern using an image sensor by projecting the pattern of the coherent radiation onto a reference surface and engendering a relative motion between the reference surface and the image sensor while capturing the reference image. The method also includes storing the reference image in a memory associated with the device.

11 Claims, 10 Drawing Sheets

REFERENCE IMAGE TECHNIQUES FOR THREE-DIMENSIONAL SENSING

CROSS-REFERENCE TO RELATED APPLICATION

This application is a division of U.S. patent application Ser. No. 12/707,678, filed Feb. 18, 2010, which claims the benefit of U.S. Provisional Patent Application 61/157,560, filed Mar. 5, 2009, which is incorporated herein by reference.

FIELD OF THE INVENTION

The present invention relates generally to imaging systems, and specifically to imaging systems using reference images for three-dimensional mapping.

BACKGROUND OF THE INVENTION

Some three-dimensional (3D) mapping systems use a reference image of a pattern projected onto a calibration surface. Examples of such systems are described in PCT Publication WO 2007/043036 to Zalevsky et al., and in PCT Publication WO 2007/105205 to Shpunt et al., both of which are incorporated herein by reference. In these types of 3D mapping systems, measured deviations from the reference image in an image of a test object allows the test object to be mapped. It is thus advantageous to use high quality reference images in the mapping systems.

The description above is presented as a general overview of related art in this field and should not be construed as an admission that any of the information it contains constitutes prior art against the present patent application.

SUMMARY OF THE INVENTION

An embodiment of the present invention provides a method, including:

providing a device that projects a pattern of coherent radiation;

capturing a reference image of the pattern using an image sensor by projecting the pattern of the coherent radiation onto a reference surface and engendering a relative motion between the reference surface and the image sensor while capturing the reference image; and storing the reference image in a memory associated with the device.

Typically, engendering the relative motion includes connecting a motion actuator to the device and activating the motion actuator while capturing the reference image.

Alternatively or additionally, engendering the relative motion includes connecting a motion actuator to a reference object having the reference surface, and activating the motion actuator while capturing the reference image.

Engendering the relative motion may include moving the device parallel to the reference surface, moving the reference surface parallel to itself, selecting an amplitude of the relative motion so as to average out effects of secondary speckles generated at the reference surface, and/or selecting an amplitude of the relative motion in response to a resolution of the image sensor.

The device may include the image sensor, the method further including:

capturing an alternative image of the pattern projected onto the reference surface using another image sensor external to the device;

registering the reference image and the alternative image; and producing an enhanced reference image from the registered reference image and alternative image, wherein storing the reference image in the memory includes storing the enhanced reference image in the memory.

In a disclosed embodiment, capturing the reference image includes:

capturing a first image of the pattern while the reference surface is at a first distance from the device, and a second image of the pattern while the reference surface is at a second distance, different from the first distance, from the device; and registering the first and second images to produce an alternative reference image, wherein storing the reference image in the memory includes storing the alternative reference image in the memory.

In another disclosed embodiment, capturing the reference image includes:

capturing a first image of the pattern while the reference surface is at a first distance from the device, and a second image of the pattern while the reference surface is at a second distance, different from the first distance, from the device, the first and the second images being configured to be registered to produce an alternative reference image; and storing the first and second images in the memory.

Typically, the device is configured to generate a three-dimensional (3D) map of an object by capturing a test image of the pattern on the object and measuring local transverse shifts of the pattern in the test image relative to the reference image.

The device may include the image sensor, and capturing the test image may include capturing the test image using the image sensor.

In some embodiments the image sensor has an integration time, and the reference surface is stationary as measured with respect to the integration time.

There is further provided, according to an embodiment of the present invention, a method, including:

providing a device that projects a pattern onto an object and captures an image of the pattern on the object using a first image sensor having a first optical characteristic;

capturing a reference image of the pattern using a second image sensor having a second optical characteristic enhanced with respect to the first optical characteristic, by projecting the pattern onto a reference surface;

registering the reference image in a frame of reference of the device; and storing the reference image in a memory associated with the device.

Typically, capturing the reference image includes capturing a first image of the pattern projected onto the reference surface using the first image sensor, and capturing a second image of the pattern projected onto the reference surface using the second image sensor, and wherein registering the reference image includes registering the first and second images to produce a registered reference image, and wherein storing the reference image includes storing the registered reference image in the memory.

Typically the device includes the first image sensor, and the second image sensor is external to and separate from the device.

The pattern may be projected using incoherent radiation.

The first and second optical characteristics may include at least one of respective fields of view, respective resolutions, respective signal to noise ratios, and respective dynamic ranges.

Typically, the device is configured to generate a three-dimensional (3D) map of the object by capturing a test image of the pattern on the object and measuring local transverse shifts of the pattern in the test image relative to the reference image.

In one embodiment the method further includes generating a map of the object using the reference image and the image of the pattern on the object.

There is further provided, according to an embodiment of the present invention, a method, including:

providing a device that projects a pattern onto an object;

capturing a reference image of the pattern using an image sensor by projecting the pattern onto a reference surface located at a first distance from the image sensor and at a second distance, different from the first distance, from the image sensor;

registering the reference image in a frame of reference of the device; and storing the reference image in a memory associated with the device.

Typically, capturing the reference image includes capturing a first image of the pattern projected onto the reference surface at the first distance using the image sensor, and capturing a second image of the pattern projected onto the reference surface at the second surface using the image sensor, and wherein registering the reference image includes registering the first and second images to produce a registered reference image, and wherein storing the reference image includes storing the registered reference image in the memory.

In a disclosed embodiment projecting the pattern includes projecting the pattern into a first field of view, and wherein the image sensor has a second field of view different from the first field of view.

The image sensor may have a field of view including a subset of the reference image.

Typically, the device is configured to generate a three-dimensional (3D) map of the object by capturing a test image of the pattern on the object and measuring local transverse shifts of the pattern in the test image relative to the reference image.

Typically, the method includes generating a map of the object using the reference image and the image of the pattern on the object.

There is further provided, according to an embodiment of the invention, apparatus, including:

a projection and imaging device including:

a projector that projects a pattern of coherent radiation; and an image sensor that captures a reference image of the pattern of coherent radiation projected onto a reference surface; and a processor which is configured to:

implement a relative motion between the device and the reference surface while the image sensor captures the reference image, and store the reference image in a memory associated with the device.

There is further provided, according to an embodiment of the invention, apparatus, including:

a projection and imaging device including:

a projector that projects a pattern of radiation onto an object; and a first image sensor having a first optical characteristic, that captures an image of the pattern on the object;

a second image sensor having a second optical characteristic enhanced with respect to the first optical characteristic and which is configured to capture a reference image of the pattern projected onto a reference surface; and a processor that is configured to:

register the reference image in a frame of reference of the device; and store the registered reference image in a memory associated with the device.

There is further provided, according to an embodiment of the present invention, apparatus, including:

a projection and imaging device including:

a projector that projects a pattern of radiation; and an image sensor that captures a reference image of the pattern projected on a reference surface; and a processor which is configured to:

generate the reference image by projecting the pattern onto the reference surface located at a first distance from the image sensor and at a second distance, different from the first distance, from the image sensor, register the reference image in a frame of reference of the device, and store the registered reference image in a memory associated with the device.

There is further provided, according to an embodiment of the present invention, a method, including:

providing a device that projects a pattern onto an object;

capturing a reference image of the pattern using an image sensor by projecting the pattern onto a reference surface which is oriented with respect to the image sensor to have a first region of the reference surface a first distance from the image sensor and to have a second region of the reference surface a second distance, different from the first distance, from the image sensor;

registering the reference image in a frame of reference of the device; and storing the reference image in a memory associated with the device.

Typically, the reference surface is planar and is oriented non-orthogonally with respect to an optical axis of the image sensor.

The reference surface may be curved between the first distance and the second distance. A curvature of the reference surface may be preconfigured to match a geometrical disparity between the image sensor and a projector configured to project the pattern, so as to introduce a constant rate of shrinkage of the reference image.

There is further provided, according to an embodiment of the present invention, apparatus, including:

a projection and imaging device including:

a projector that projects a pattern of radiation onto an object; and an image sensor that captures a reference image of the pattern projected onto a reference surface which is oriented with respect to the image sensor to have a first region of the reference surface a first distance from the image sensor and to have a second region of the reference surface a second distance, different from the first distance, from the image sensor; and a processor which is configured to:

use the image sensor to capture the reference image by projecting the pattern onto the reference surface, register the reference image in a frame of reference of the device, and store the registered reference image in a memory associated with the device.

The present invention will be more fully understood from the following detailed description of the embodiments thereof, taken together with the drawings in which:

DETAILED DESCRIPTION OF EMBODIMENTS

Overview

Embodiments of the present invention produce an enhanced quality reference image for a device that generates a three-dimensional (3D) map of a test object. The device projects a pattern onto a calibration object, and captures an image of the projected pattern as the reference image. The pattern is then projected onto the test object and the device images the projected pattern. The device measures transverse shifts in the imaged pattern of the test object, compared to the reference image, to generate a 3D map of the test object.

In some embodiments, the pattern is formed using coherent radiation. Speckles in the reference image, caused by non-specularity or roughness in the calibration object, are removed by applying a small relative motion between the device and the calibration object. Removal of the speckles enhances the quality of the reference image.

In some embodiments the reference image is formed by capturing two different images of the pattern projected onto the calibration object. The different images are registered with each other, and the enhanced quality reference image is generated from the registered images.

While for the sake of concreteness, the embodiments concentrate on 3D mapping device, it should be understood that the methods of the present invention are beneficially applicable to any setup requiring enhancement of the image of the projected pattern.

DETAILED DESCRIPTION

Figure 1:
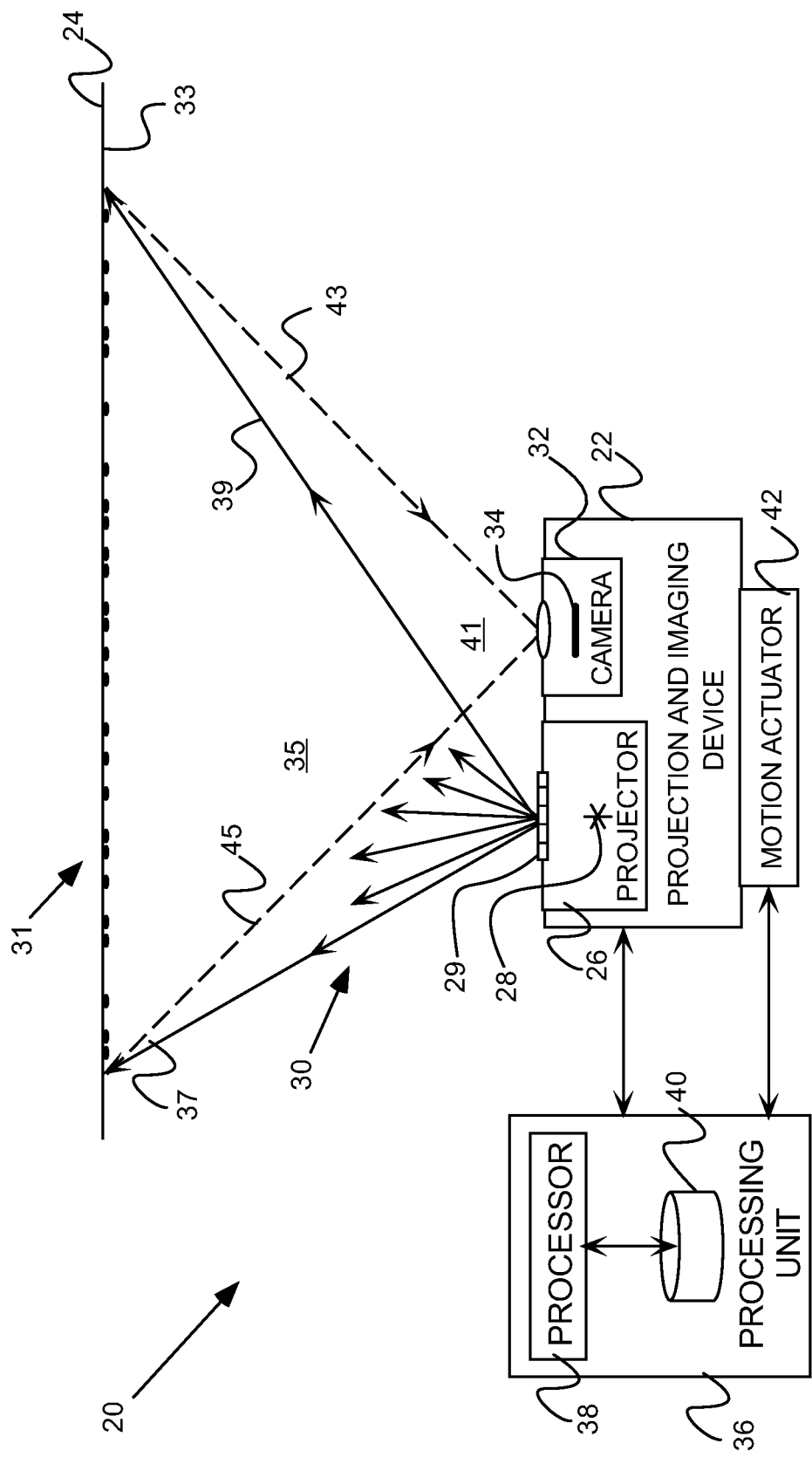
FIG. 1 is a schematic block diagram of a system for generating a reference image, according to an embodiment of the present invention.

Reference is now made to FIG. 1, which is a schematic block diagram of a system 20 for generating a reference image, according to an embodiment of the present invention. FIG. 1 and the other block diagrams in this disclosure are top views. System 20 comprises a projection and imaging device 22, which is used for performing three-dimensional (3D) mapping of objects. The operation and functioning of a device similar to device 22 are described in more detail in PCT Publication WO 2007/043036, referred to in the Background of the Invention.

Device 22 comprises a projector 26, which uses a coherent source of radiation 28, typically a laser diode, followed by a projection optics 29, to generate a pattern 30 of the radiation. Pattern 30 projects in a field of view (FOV) 35 of the projector, the field of view being illustrated schematically in FIG. 1 by projector FOV bounding lines 37 and 39. The projector projects pattern 30 onto a reference object 24 acting as a calibration object for system 20, and the pattern typically images as a base reference 31 on a reference surface 33 of object 24. Projection optics 29 may vary according to application, and may include but are not limited to a diffractive optical element projector, a micro-lens projector, a diffuser-based primary speckle projector, or other type of projector utilizing coherent light. Depending on the specific projector embodiment and the system requirements for device 22, the base reference may have a relatively complicated structure. For clarity and simplicity and by way of example, in the following description the base reference is assumed to comprise an array of distinct spots distributed in some fashion over the reference surface, so that base reference 31 may also be referred to as array of spots 31. Those having ordinary skill in the art will be able to adapt the description, mutatis mutandis, for base references having a structure other than that of distinct spots.

Device 22 also comprises an image sensor 32, herein also referred to as a device camera 32. The device camera has a field of view 41, which is illustrated schematically by device camera FOV bounding lines 43 and 45. Camera 32 is configured to capture an image of the spots formed by pattern 30 on an array 34, typically a CCD (charge coupled device) array or CMOS (complementary metal-oxide-semiconductor), in the device camera. Array 34, together with optics of the camera, effectively defines a frame of reference of camera 32. The fields of view of projector 26 and device camera 32 are generally different, but by way of example are assumed to overlap at reference object 24, so that the image captured by the camera comprises all the spots projected onto the reference object by the projector.

The captured image is analyzed in a processing unit 36 of the system, to generate a reference image for use by device 22 in 3D mapping of objects other than the reference object. Such objects are assumed, by way of example, to comprise an "object-to-be-mapped" by system 20, also referred to herein as a test object.

Processing unit 36 comprises a processor 38 and a memory 40, typically including non-volatile and volatile sections. Processor 38 typically stores system operating software, including the reference image, in a non-volatile section of memory 40. Processing unit 36 may be physically separate from device 22, or alternatively, the processing unit may be incorporated together with device 22 into a single package.

The software used by processor 38 may be downloaded to processing unit 36 in electronic form, over a network, for example, or it may alternatively be supplied to the processing unit on tangible media, such as on a CD-ROM.

Once the reference image has been obtained and stored, device 22, together with processing unit 36, is able to perform 3D mapping of the test object. The 3D mapping is performed by projecting pattern 30 onto the test object, whereupon camera 32 captures an image of the pattern projected onto the test object. Processor 38 measures local transverse shifts of the spots of the pattern in the test image relative to respective spots, corresponding to spots 31, in the reference image. Using the transverse shifts, the processor is able to measure depths of the test object at the positions of the spots projected onto the test object.

As stated above, pattern 30 is formed by optics 29 using coherent light source. Because of the necessarily non-specular nature of surface 33, so called secondary speckles are generated at the surface. The term "secondary" refers to the fact that these speckles come from the roughness of the surface on which the projected pattern impinges. The secondary speckles are caused by adjacent regions of the surface scattering their incident coherent radiation so that the scattered radiation interferes constructively or destructively. The adjacent regions are typically in portions of the surface upon which a spot 31 is formed. In addition to being a function of the characteristics of surface 33, the secondary speckle characteristics depend on properties of the incident coherent radiation, as well as on the numerical aperture of the image sensor, camera 32.

Array 34 has a finite integration time, typically of the order of 33 ms, so that absent the embodiments described herein, images of the secondary speckle are integrated multiplicatively into the images of spots 31 comprising the reference image. This integration reduces, in some cases drastically, the contrast of the spot images. Other negative effects of the secondary speckles include the fact that in systems of interest the speckle image has a size of the order of a single pixel, and it is difficult or impossible to remove the speckle effects digitally.

These considerations apply to any system that uses coherent radiation to project patterns, and any situation where such patterns need to be captured. Moreover, the system/situation need not be confined to capturing an image for 3D mapping purposes only. Consequently, for substantially any object that is stationary relative to the integration time of the image sensor, and which is illuminated by coherent radiation, the image captured benefits from the methods described herein for removing speckles.

As explained below, embodiments of the present invention eliminate the deleterious effects on the reference image caused by the secondary speckles.

Device 22 is attached to a motion actuator 42, which is typically under control of processing unit 36. Actuator 42 is configured to move device 22, so that there is relative motion between reference object 24 and its surface 33, and image sensor 32. The motion is typically configured to be linear and oscillatory, and in some embodiments the linear direction of the motion is selected to be parallel to surface 33. However, there is no requirement that the motion be linear, oscillatory, and parallel to surface 33, and other types of motion, such as vibratory, or linear, oscillatory, and orthogonal to surface 33 may be applied by unit 42 to device 22. As explained below, the motion is applied to remove the effects on the reference image of the secondary speckles, and those having ordinary skill in the art will be able to determine an optimum type of motion to be applied to device 22, without undue experimentation.

Figure 2:
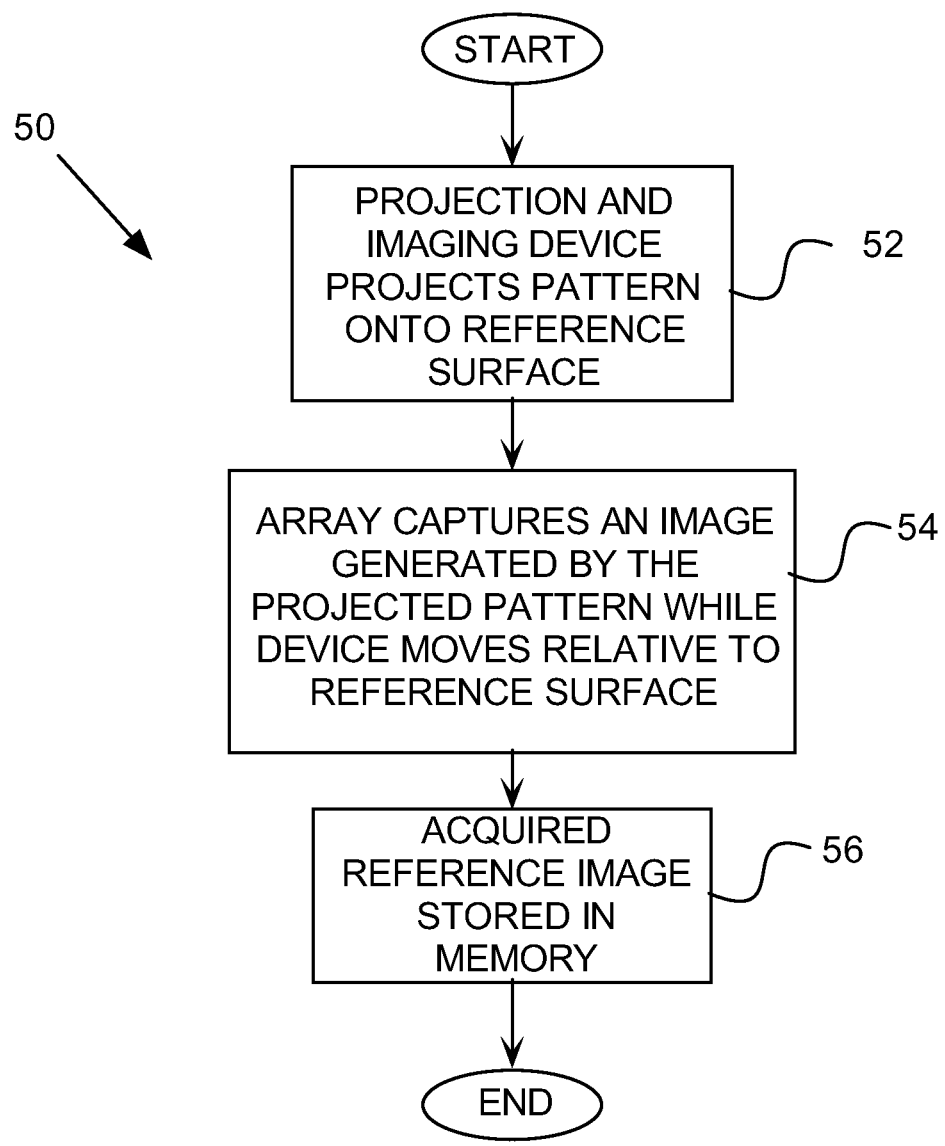
FIG. 2 is a flowchart describing steps for acquiring the reference image in the system of FIG. 1, according to an embodiment of the present invention.

FIG. 2 is a flowchart 50, describing steps for acquiring the reference image in system 20, according to an embodiment of the present invention.

In an initial step 52, projector 26 of the projection and imaging device projects pattern 30 onto reference surface 33.

In an imaging step 54, array 34 captures an image of base reference 31 generated by the projected pattern, and while capturing the image, processing unit 36 activates actuator 42 to move device 22, so that the device moves relative to reference surface 33. The type of motion applied is selected as described above with reference to FIG. 1. The amplitude of the motion is configured to be sufficient to effectively average out the effects of the secondary speckles on the image of base reference 31, while maintaining the image of the base reference very nearly constant on array 34. It will be understood that because of the characteristics of the secondary speckles, the amplitude of the motion required is small, typically finer than the resolution of camera 32, i.e., of the order of one pixel dimension or less of array 34.

In a final step 56, the acquired reference image is stored in memory 40, for use by processor 38 in 3D mapping of a test object.

Figure 3:
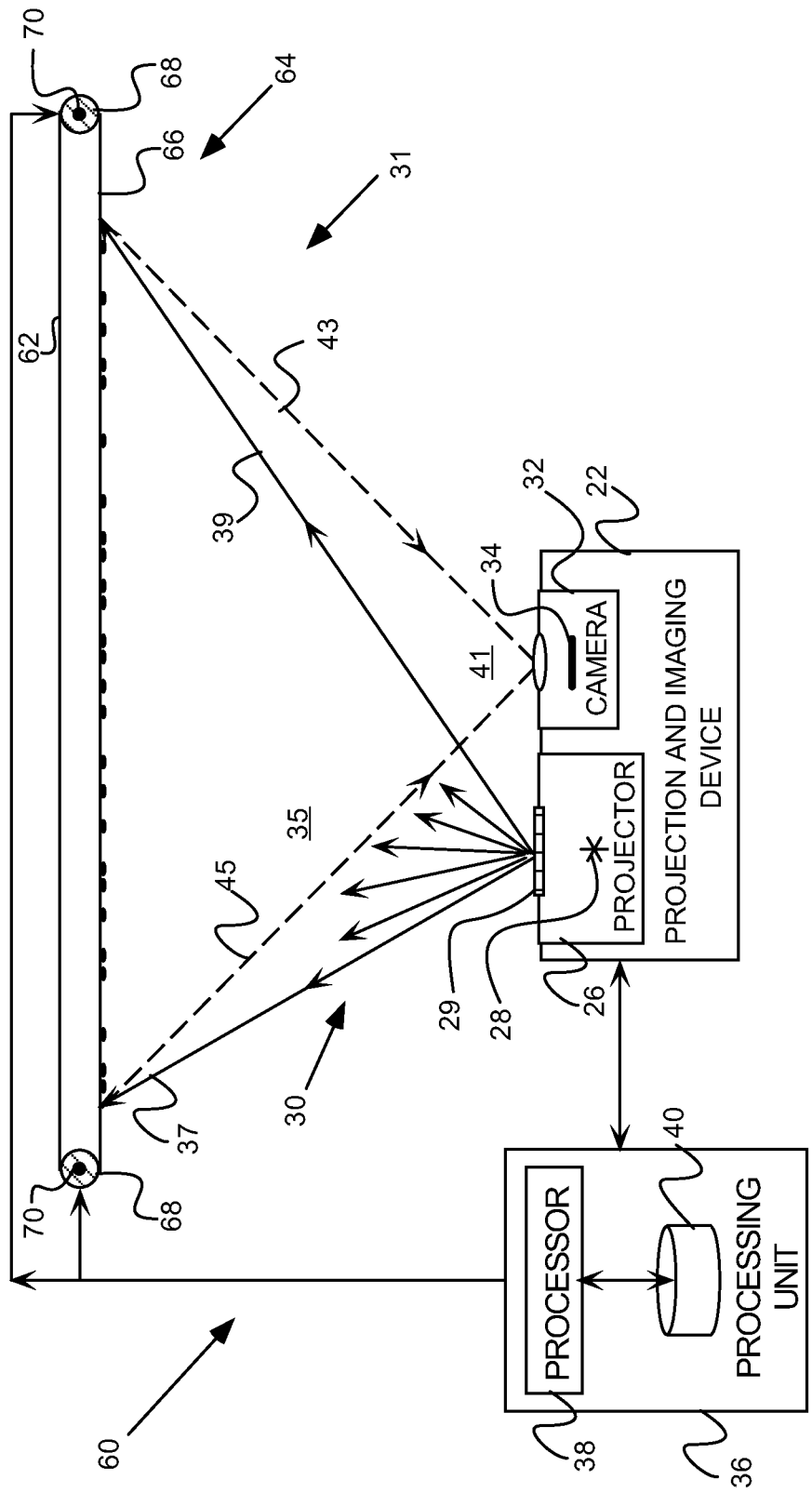
FIG. 3 is a schematic block diagram of an alternative system for generating a reference image, according to an embodiment of the present invention.

FIG. 3 is a schematic block diagram of an alternative system 60 for generating a reference image, according to an embodiment of the present invention. Apart from the differences described below, the operation of system 60 is generally similar to that of system 20, and elements indicated by the same reference numerals in both systems 20 and 60 are generally similar in construction and in operation. Instead of moving device 22 (as in system 20), in system 60 the reference surface upon which spots 31 are formed is moved.

By way of example, in place of reference object 24, system 60 comprises a reference object 62, which is formed as a continuous sheet 64 in the form of a closed loop. Reference object 62 acts as a calibration object for system 60. Sheet 64 has an outer surface 66 that is non-specular. Sheet 64 is mounted on rollers 68 which may be rotated by respective rotators 70, under control of processing unit 36. In some embodiments, only one rotator is used, attached to one roller 68, and the other roller is free to rotate. Since in system 60 device 22 is not moved, actuator 42 is not present in the system.

Rotation of rollers 68 moves surface 66 parallel to itself. Typically, the rotation is unidirectional so that surface 66 moves in a loop. Alternatively, the rotation of the rollers is configured to be oscillatory, so that surface 66 also moves in an oscillatory manner.

The acquisition of the reference image in system 60 is generally similar to the acquisition in system 20, as described above with reference to FIG. 2. Thus, projector 26 initially projects pattern 30 onto reference surface 66, and array 34 captures an image of spots 31 generated by the projected pattern. While capturing the image, processing unit 36 activates rotators 70 to move surface 66, so that the surface moves relative to device 22. The amplitude of the motion is configured to be sufficient to effectively average out the effects of the secondary speckles on the image of spots 31 formed on array 34. As for system 20, in system 60 the amplitude of motion required is small, and is typically of the same order of magnitude as that of system 20.

System 60 may comprise a reference object other than reference object 62, and/or means to move the reference object other than rotators 70, since any such system only requires that the reference object move relative to device 22. Thus, alternative methods for implementing the relative motion by moving the reference object include, but are not limited to, having a reference object similar to object 24, and attaching a motion actuator similar to actuator 42 to the reference object. Other types of reference object and/or motion actuators will be familiar to those having ordinary skill in the art, and are assumed to be comprised within the scope of the present invention.

Systems 20 and 60 may be combined to form a composite embodiment of the present invention. In the composite embodiment, during acquisition by array 34 of the image of spots 31, both device 22 and the reference object are moved.

Figure 4:
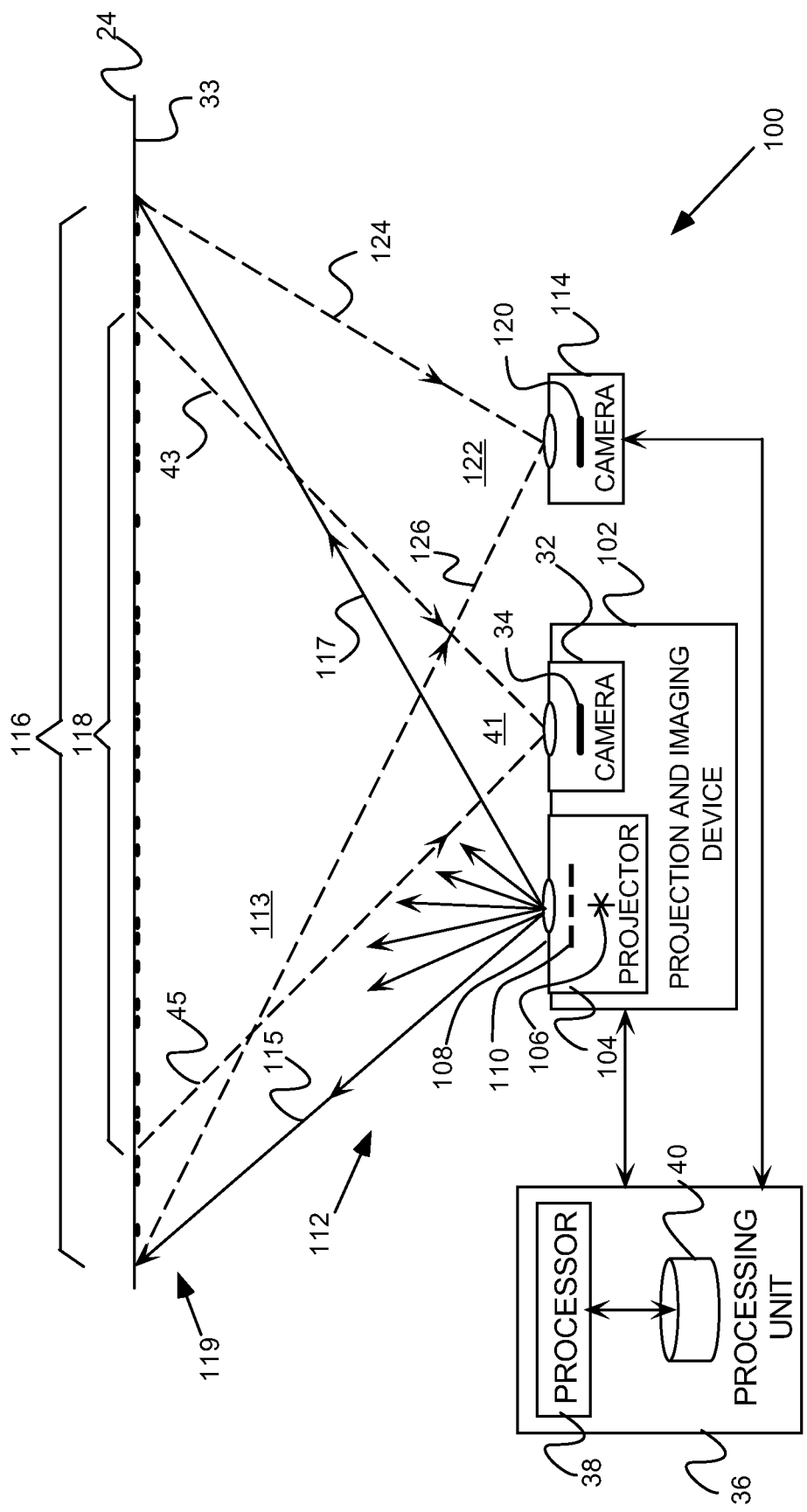
FIG. 4 is a schematic block diagram of a further alternative system for generating a reference image, according to an embodiment of the present invention.

FIG. 4 is a schematic block diagram of a further alternative system 100 for generating a reference image, according to an embodiment of the present invention. Apart from the differences described below, the operation of system 100 is generally similar to that of system 20, and elements indicated by the same reference numerals in both systems 20 and 100 are generally similar in construction and in operation.

Unlike systems 20 and 60, system 100 uses two different images of a reference object, as is explained in more detail below.

System 100 comprises a projection and imaging device 102 which is generally similar to device 22, and which comprises device camera 32, described above with reference to FIG. 1. Device 102 also comprises a projector 104, which may be generally similar to projector 26, but which in system 100 may comprise as its radiation source either a coherent or an incoherent source. Hereinbelow, for simplicity, projector 104 is assumed to comprise an incoherent source 106.

In the case of an incoherent source, in place of coherent projection optics 29 (such as a diffuser or system incorporating diffractive optical elements), projector 104 comprises optics 108, which typically have a small numerical aperture, and a mask 110. Among other possible implementations, mask 110 can either be a transmission slide or a micro-lens array designed to create the pattern to be projected. The small numerical aperture of optics 108 generates a corresponding large depth of focus of an image of the mask. A pattern 112, that is generally similar to pattern 30 (but which is not necessarily formed by coherent radiation), is formed by projector 104 imaging the mask. The pattern is projected into a projector field of view 113, which is illustrated schematically by projector FOV bounding lines 115 and 117. Pattern 112 is projected onto surface 33 to form a base reference 119, herein by way of example assumed to comprise an array of spots 119 which are generally similar to spots 31, on the surface.

System 100 comprises an image sensor 114, herein also termed external camera 114, which is separate from device 102. The external camera is typically of a significantly higher quality than the device camera. Thus, the two cameras typically have at least one different optical characteristic, such as different fields of view, different resolutions, different signal to noise ratios, or different dynamic ranges. Marketing considerations typically require the cost of the device camera to be as low as possible, so that the price of devices 22 and 102 may be as low as possible. Such considerations do not apply to the cost of the external camera, which is not intended to be marketed with devices 22 or 102. Rather, as is described hereinbelow, the external camera is used for generating the reference image for device 102, typically in a production facility for the device. Consequently, external camera 114 may have one or more of its optical characteristics, referred to above, enhanced compared to that of the device camera. For simplicity, the following description assumes the optical characteristic of the two cameras to be their field of view or their resolution, so that external camera 114 may have a larger field of view than the field of view of the device camera, and/or may have a finer resolution than the resolution of the device camera. While the field of view and the resolution of the device camera is fixed according to the field of view that is decided for device 22 or device 102, also referred to herein as the product devices, it will be understood that it is often beneficial that the reference image is formed with a larger field of view and/or better fidelity than that of any particular product device.

In the following description, external camera 114 is assumed to have both a larger field of view, and a finer resolution, than the field of view and resolution of the device camera. Those of ordinary skill in the art will be able to adapt the description, mutatis mutandis, if only one of these conditions holds, i.e., for an external camera wherein either the field of view is larger or the resolution is finer than that of the device camera.

Pattern 112 projects spots 119 onto surface 33, and the projected spots are assumed to comprise a projected set 116 of the spots. Projected set 116 is also referred to herein as full set 116. A field of view 122 of camera 114, illustrated schematically by external camera FOV bounding lines 124 and 126, is configured to encompass full set 116. In contrast, field of view 41 of the device camera is configured to encompass a subset 118 of the full set, subset 118 comprising a smaller number of spots 119 than set 116.

As stated above, the resolution of external camera 114 is assumed to be finer than the resolution of device camera 32. By way of example, the finer resolution is assumed to be achieved by external camera 114 comprising a pixel array 120 having more pixels than the number of pixels in array 34. To comply with the finer resolution and larger field of view assumed for the external camera, other characteristics of the external camera and its elements may need to be different from those of the device camera. For example, the area of array 120 may need to be greater than the area of array 34. The external camera optics are assumed to be adjusted accordingly to provide the required field of view.

Figure 5:
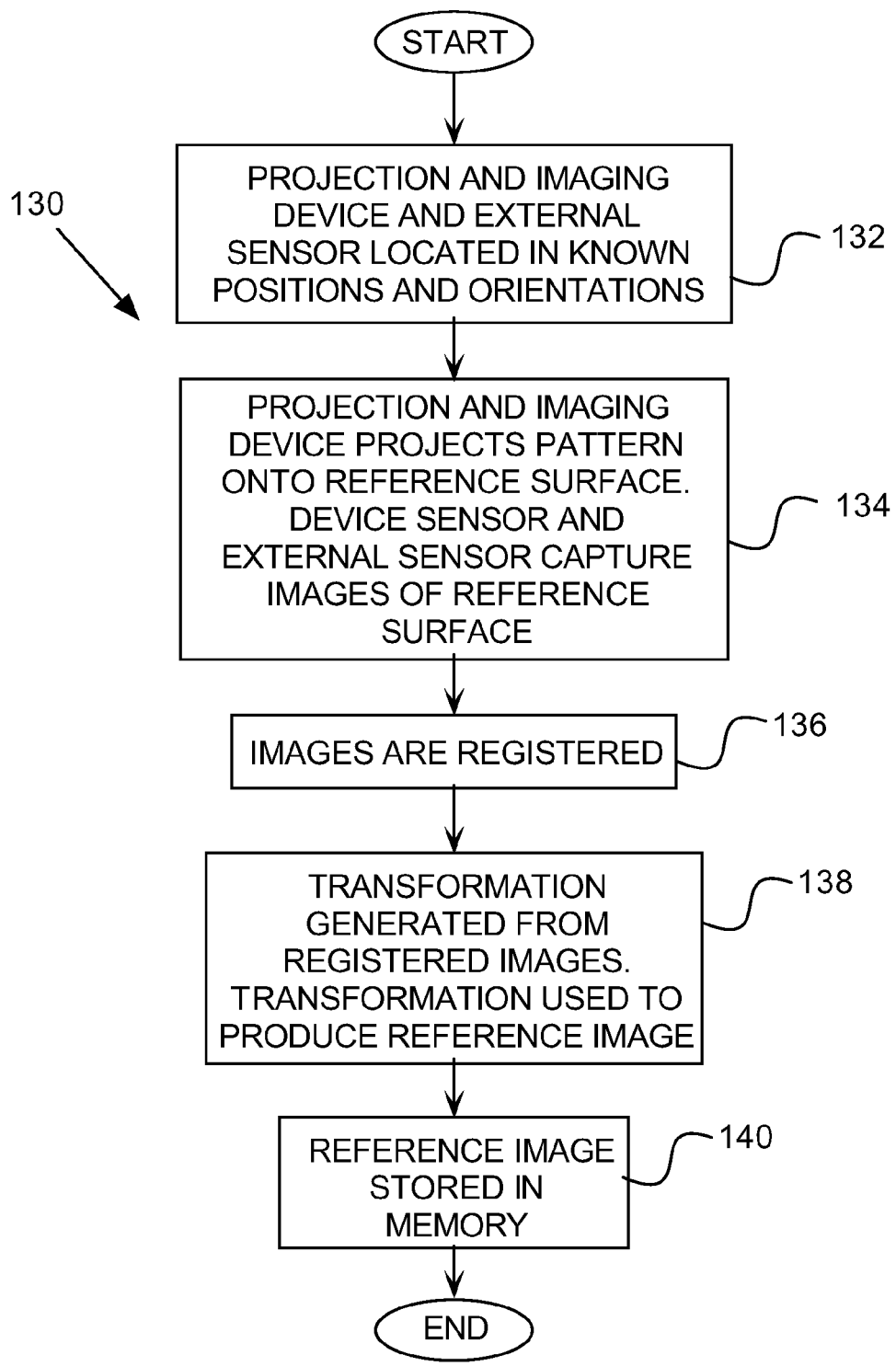
FIG. 5 is a flowchart describing steps for acquiring the reference image in the system of FIG. 4, according to an embodiment of the present invention.

FIG. 5 is a flowchart 130, describing steps for acquiring the reference image in system 100, according to an embodiment of the present invention. The description assumes, by way of example, that base reference 119 comprises array of spots 119.

In an initial step 132, device 102 and external camera 114 are located in known positions, with known orientations.

In a projection and image capture step 134, projector 104 projects pattern 112 onto reference surface 33. Array 34 captures an image of subset 118 of the spots generated by the projected pattern. In addition, array 120 captures an image of the full set of the spots.

In a registration step 136, the two images are transferred to processing unit 36. The processing unit is configured to register the two images, using spots of subset 118 that are common to both images. The registration may be by any convenient method of image registration known in the art. Typically the method used comprises a feature-based algorithm, the processing unit initially identifying the spots in each image, and then correlating spots common to both images. Typically one or both of the images may need to be locally transformed by local scaling, rotating, and/or translating of regions of the images to achieve good registration. While the local transformations are typically linear, in some embodiments the transformations may be non-linear. In addition, the processing unit may apply epipolar or other geometric relations known in the art to perform the registration, using the known positions and orientations of the device camera, the external camera, and projector 104.

In a global transformation step 138, the processing unit combines the procedures described above, including the local transformations, into a global transformation of the image captured by the external camera. The global transformation encompasses the spots of the larger field of view of the external camera, and also maintains the finer resolution of the external camera. The combined procedures may be performed, for example, by using parameters derived from the local transformations to estimate coefficients of a polynomial representing the global transformation. The processing unit then applies the global transformation to the image captured by the external camera, so producing an image suitable for use by the device camera, i.e., an image that is registered with respect to the frame of reference (described above with reference to FIG. 1) of the device camera.

In a final step 140, the image produced in step 138 is stored in memory 40 for use by the device camera as its reference image. The reference image is an enhanced image, since it includes the spots of the larger field of view of the external camera, and in addition has the finer resolution of the external camera.

Figure 6:
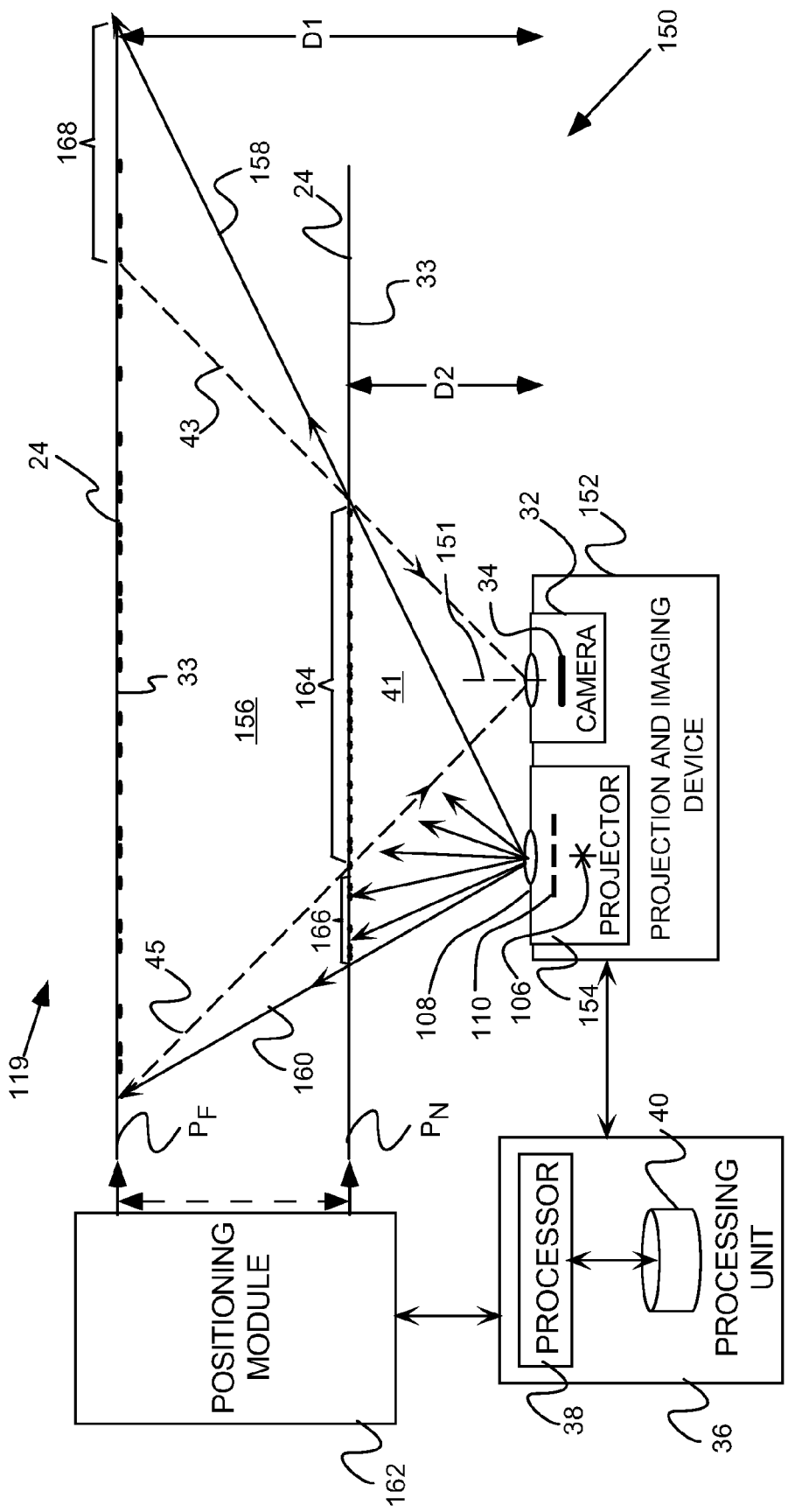
FIG. 6 is a schematic block diagram of a yet further alternative system for generating a reference image, according to an embodiment of the present invention.

FIG. 6 is a schematic block diagram of a yet further alternative system 150 for generating a reference image, according to an embodiment of the present invention. Apart from the differences described below, the operation of system 150 is generally similar to that of system 100 (FIG. 4), and elements indicated by the same reference numerals in both systems 100 and 150 are generally similar in construction and in operation.

As is the case in system 100, system 150 uses two images of reference object 24. However, system 150 does not comprise external camera 114. Rather, the two images of reference object 24 are formed by device camera 32 when the object is at different distances, D1 and D2, D1>D2, from a projection and imaging device 152, which except as explained below, is generally similar to device 102. D1 and D2 are typically measured parallel to an optical axis 151 of camera 32.

Projection and imaging device 152 in system 150 comprises device camera 32 and a projector 154. Projector 154 is generally similar to projector 104, but may have a different field of view. A field of view 156 of projector 154, illustrated in FIG. 6 by projector FOV bounding lines 158 and 160, is configured so that a subset of the spots projected by the projector onto reference object 24, when the reference object is at distance D1, are within the field view of the device camera.

In one embodiment, object 24 is connected to a positioning module 162, which is controlled by processing unit 36. Module 162 is configured to reposition reference object 24 according to instructions from processing unit 36, and is also configured so that the processing unit is aware of the positions of the object. Alternatively or additionally, a positioning module generally similar to module 162 is connected to device 152, so that the device may be located in known positions by unit 36. Further alternatively, reference objects at distances D1 and D2 can be located in different physical locations, and the device 152 is statically positioned in these locations, in which case there is no need for positioning module 162.

Figure 7:
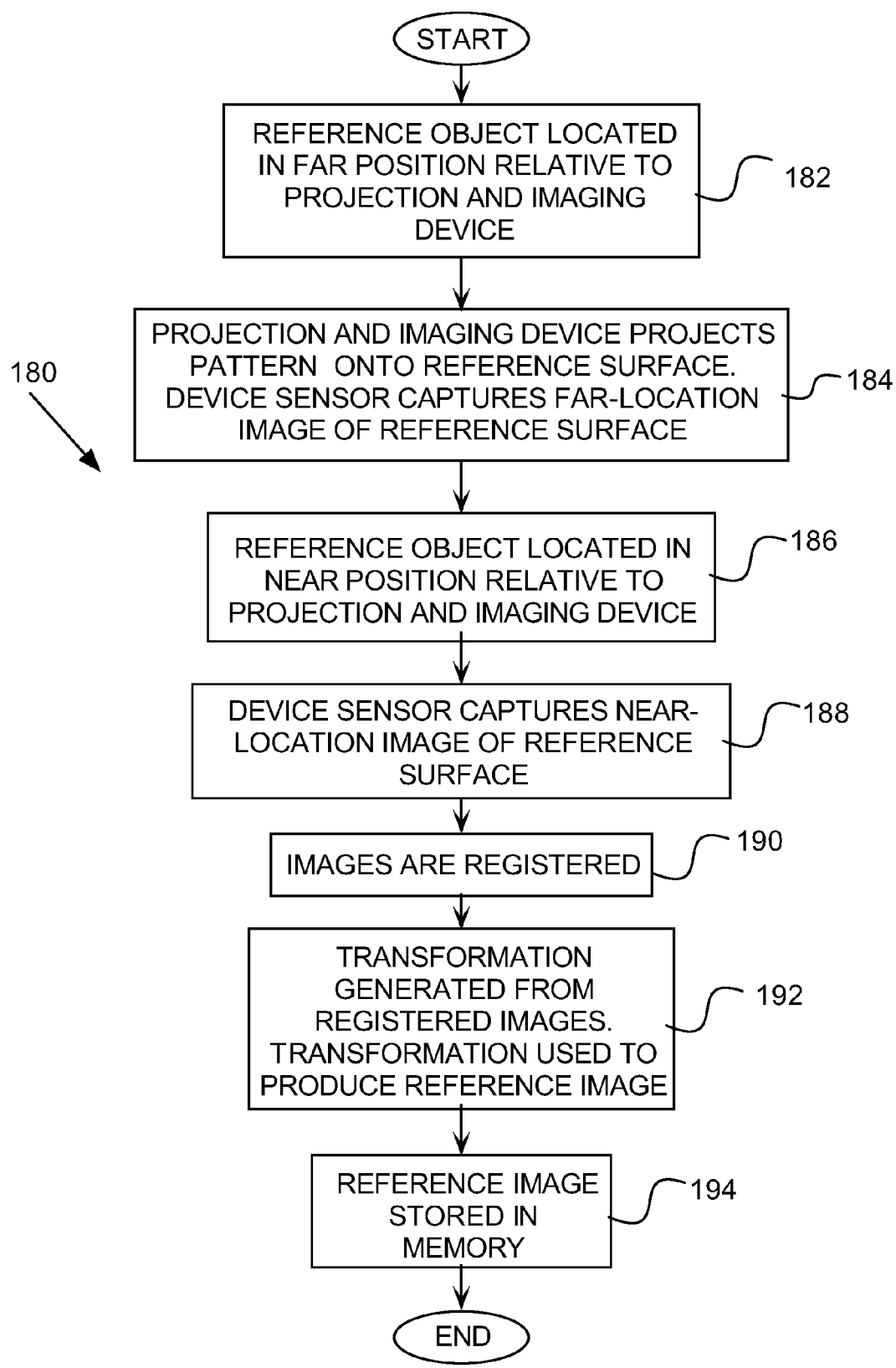
FIG. 7 is a flowchart describing steps for acquiring the reference image in the system of FIG. 6, according to an embodiment of the present invention

FIG. 7 is a flowchart 180, describing steps for acquiring the reference image of system 150, according to an embodiment of the present invention. In the description, the different distances between the device and the reference object are assumed to be implemented using module 162. The description assumes, by way of example, that base reference 119 comprises array of spots 119.

In an initial step 182, module 162 locates reference object 24 in a far position $P_F$ so that it is distance D1 from device 152.

In a first projection and imaging step 184, projector 154 projects its pattern of spots 119 onto surface 33 of the reference object, and camera 32 captures a first image of the surface. The first image is also referred to herein as the far-location image.

In a second projection and imaging step 186, module 162 locates the reference object in a near position $P_N$, so that it is distance D2, smaller than D1, from device 152. As is illustrated in FIG. 6, in the near position, a subset 164 of spots 119 is in the field of view of the device camera, and a subset 166 of the spots is not in the camera's field of view. However, spots corresponding to subset 166 are in the camera's field of view at the far position, $P_F$. In addition, subset 164 includes a further subset 168 of spots 119, subset 168 being within the camera's field of view at the near position $P_N$, but not in its field of view at the far position $P_F$.

In a third projection and imaging step 188 device camera 32 captures a second image of surface 33 when the reference object is in near position $P_N$. The second image is also referred to herein as the near-location image.

In a registration step 190, processing unit 36 registers the far-location and near-location images, using spots that are common to the two images. The registration is generally as is described for registration step 136 of flowchart 130, mutatis mutandis, using local transformations and geometric relations that are appropriate for system 150, such as relations that may be applied from the known distances D1 and D2 of the images.

In a global transformation step 192, the processing unit combines the procedures performed in the registration step into a global transformation of the spots of the far-location image onto the near-location image. Transformation step 192 is generally similar, mutatis mutandis, to transformation step 138 of flowchart 130. In transformation step 192, the processing unit produces a reference image comprising all the spots of the far-location image at near position $P_N$. The reference image thus corresponds to an effective field of view larger than the actual FOV, as is illustrated in FIG. 6, since the reference image includes positions of subset 166 of spots 119.

Referring back to FIG. 6, the figure illustrates a beneficial property of the reference image of embodiments of the present invention: that subsets of the reference image correspond to the FOV of the device at different distances from the device. In other words, the reference image typically comprises a superset of the FOV of the device at a particular distance. This property is illustrated by the description above with reference to subset 166. which as stated, is within the far position FOV, but not within the near position FOV, and also with reference to subset 168, which is within the near position FOV, but not within the far position FOV.

Continuing with flowchart 180, in a final step 194 processing unit 36 stores the reference image produced in step 190 in memory 40.

The description above, with reference to systems 100 and 150, has assumed capturing and registering two images to produce an enhanced reference image for use in the systems. Those having ordinary skill in the art will be able to adapt the description for the cases of capturing and registering more than two images, in order to produce further enhanced reference images, and such cases are assumed to be comprised within the scope of the present invention.

Figure 8:
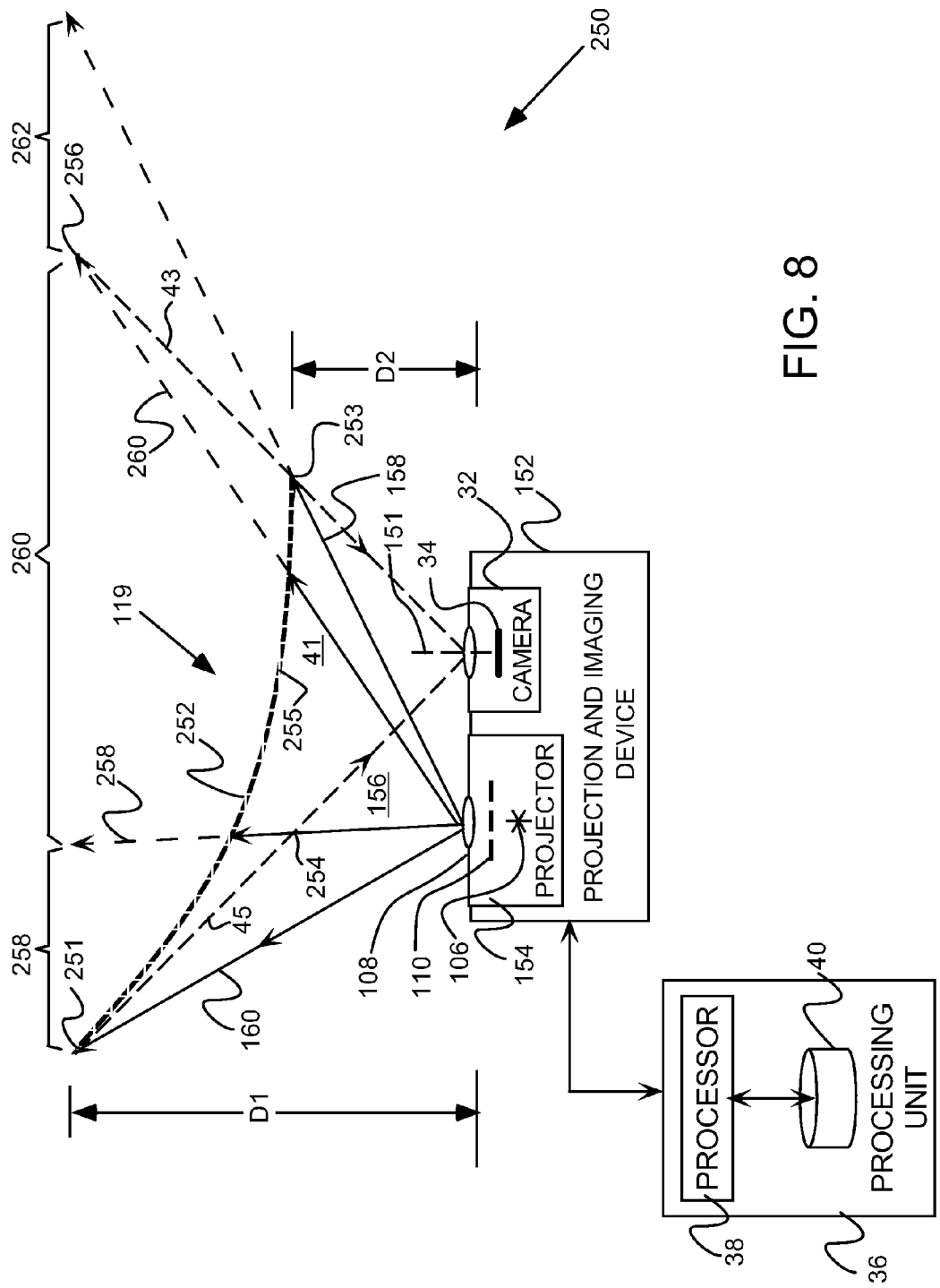
FIG. 8 is a schematic block diagram of another alternative system for generating a reference image, according to an embodiment of the present invention.

FIG. 8 is a schematic block diagram of another alternative system 250 for generating a reference image, according to an embodiment of the present invention. Apart from the differences described below, the operation of system 250 is generally similar to that of system 150 (FIG. 6), and elements indicated by the same reference numerals in both systems 250 and 150 are generally similar in construction and in operation.

Unlike system 150, system 250 does not comprise positioning module 162, or reference object 24. Rather, system 250 comprises a reference object 252 which has a surface 255 having varying distances, measured parallel to optical axis 151, to device 152, so that the surface is not necessarily oriented orthogonally with respect to the optical axis. By way of example, surface 255 is assumed to be a distance D1 from device 152 at a point 251 on the reference object, and to be a distance D2 from device 152 at a point 253 on the reference object. Array of spots 119 are projected onto surface 255.

In system 250, reference object 252 and its surface are assumed to be curved, typically in the dimension substantially parallel to the triangulation base (a vector connecting camera 32 and projector 154) of device 152. Typically the curvature is preconfigured to match a geometrical disparity between camera 32 and projector 154 of device 152, so as to introduce a constant rate of shrinkage of a captured reference image at camera 32.

In FIG. 8, a line 258 corresponds to a first direction of projection from projector 154. Line 258 passes from optics 108 through a point 254 which is distant D2 from device 152 and which lies on bounding line 45. A line 260 corresponds to a second direction of projection from projector 154. Line 260 passes from optics 108 through a point 256 which is distant D1 from device 152 and which lies on bounding line 43.

Projector bounding lines 158 and 160, and lines 258 and 260, define subsets of spots 119 on surface 255. A subset 258 is bounded by lines 160 and 258; a subset 260 is bounded by lines 258 and 260; and a subset 262 is bounded by lines 260 and 158. Thus, the reference image generated on surface 255 comprises subsets of captured images of camera 32 at different distances from the camera.

Figure 9:
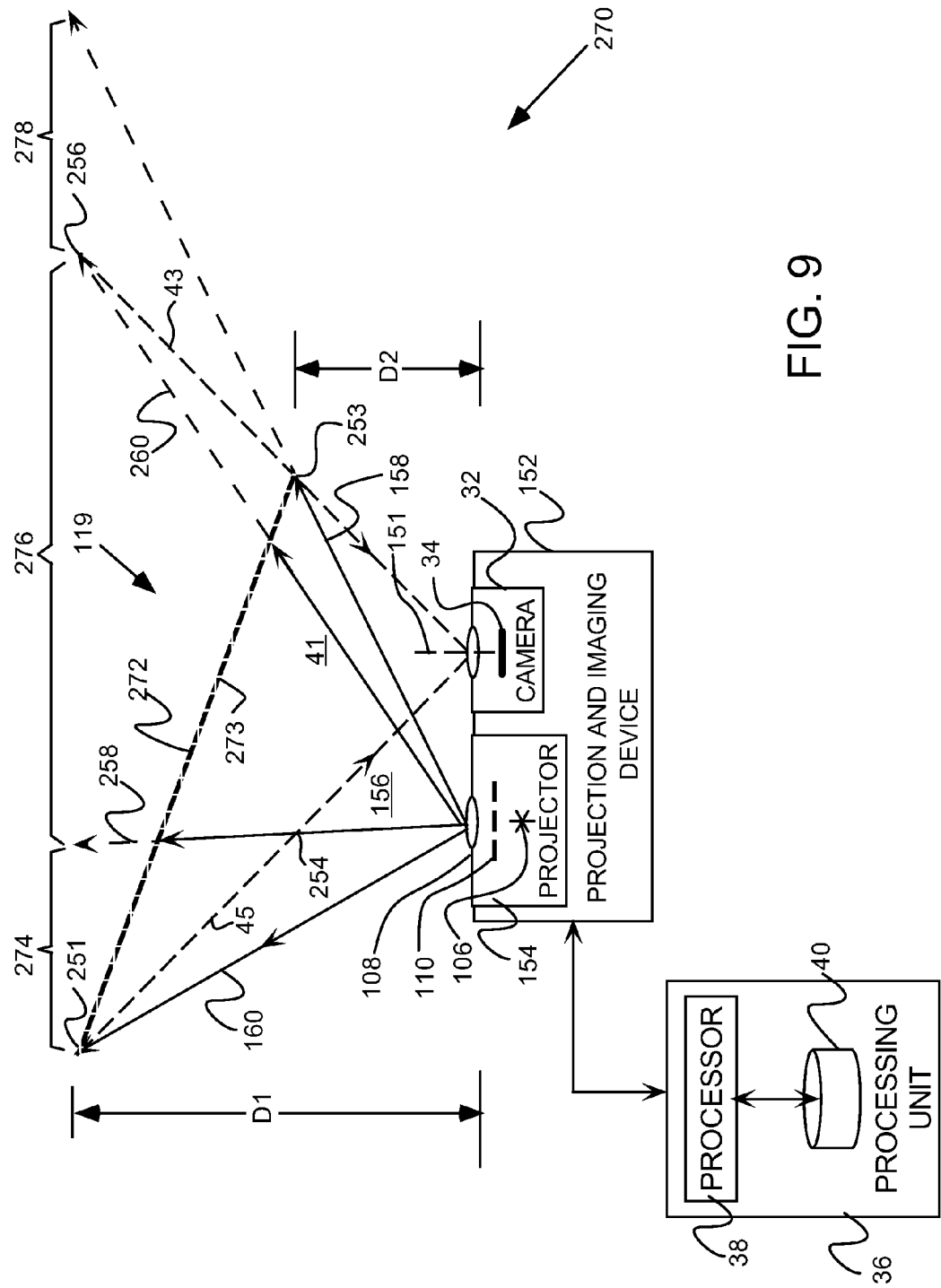
FIG. 9 is a schematic block diagram of yet another alternative system for generating a reference image, according to an embodiment of the present invention.

FIG. 9 is a schematic block diagram of yet another alternative system 270 for generating a reference image, according to an embodiment of the present invention. Apart from the differences described below, the operation of system 270 is generally similar to that of system 250 (FIG. 8), and elements indicated by the same reference numerals in both systems 270 and 250 are generally similar in construction and in operation.

In system 270, a reference object 272 replaces reference object 252 of system 250. Reference object 272 comprises a planar surface 273 which is not orthogonal to axis 151. In system 270 the planar surface has distances from device 152 which vary from D1 to D2. As for system 250, in system 270 projector bounding lines 158 and 160, and lines 258 and 260, define subsets of spots 119 on surface 273. A subset 274 is bounded by lines 160 and 258; a subset 276 is bounded by lines 258 and 260; and a subset 278 is bounded by lines 260 and 158. Subsets 274, 276, and 278 respectively correspond to subsets 258, 260, and 262 of system 250 (FIG. 8), so that, as for system 250, the reference image generated on surface 273 comprises subsets of captured images of camera 32 at different distances from the camera.

Consideration of FIGS. 8 and 9 illustrate a property of systems 250 and 270: that using one reference object encompassing a wide field of view of the projector enables reference images to be generated for cameras having smaller fields of view than that of the projector.

Figure 10:
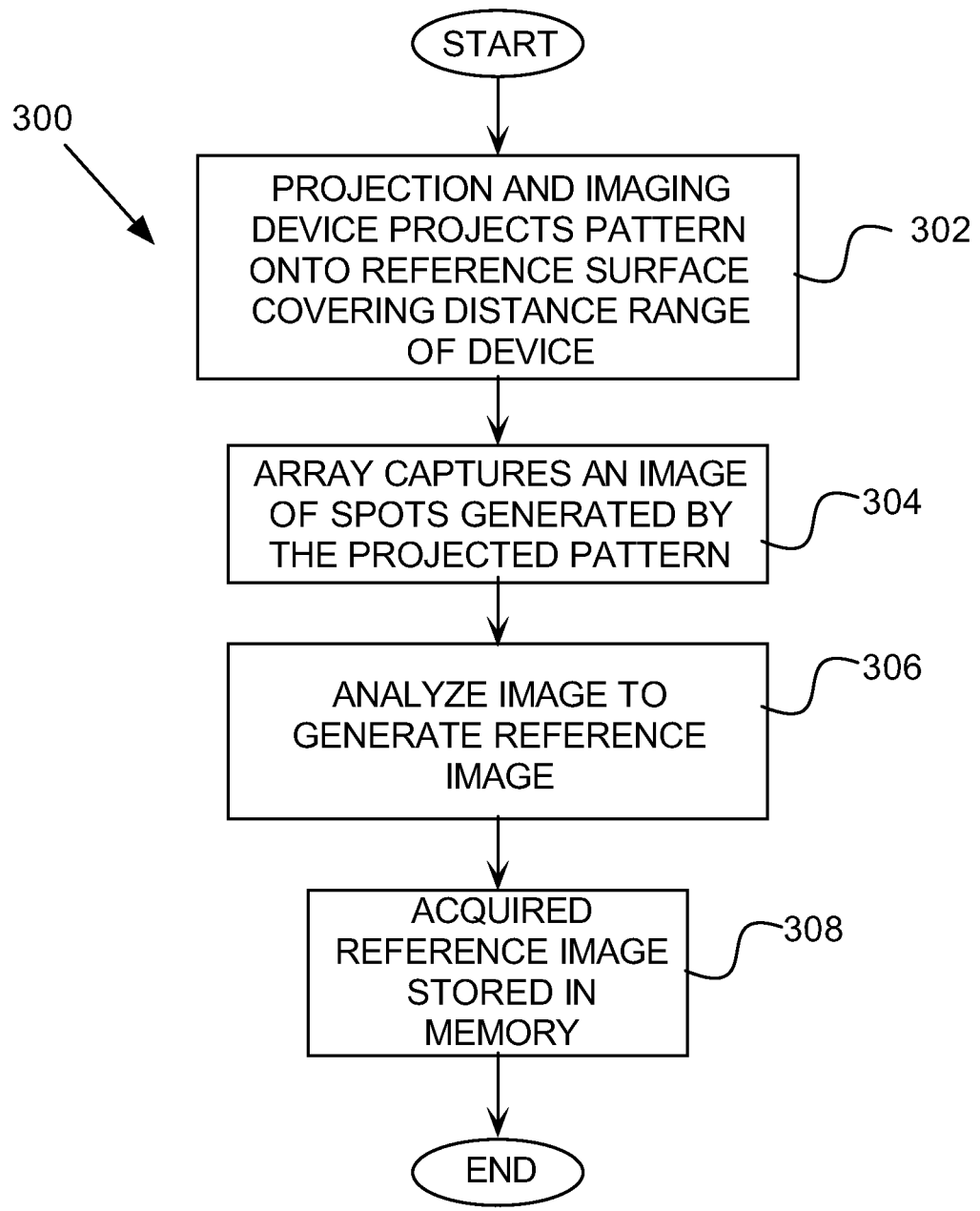
FIG. 10 is a flowchart describing steps for acquiring the reference image of the system of FIG. 8 or of FIG. 9, according to an embodiment of the present invention.

FIG. 10 is a flowchart 300, describing steps for acquiring the reference image of system 250 or of system 270, according to an embodiment of the present invention. For simplicity and clarity, the description refers to system 250. Those having ordinary skill in the art will be able to adapt the description of the flowchart, mutatis mutandis, for system 270. The description assumes, by way of example, that base reference 119 comprises array of spots 119.

In an initial step 302, reference object 252 is positioned in front of device 152, and projector 154 projects spots 119 onto the surface of the reference object. Distances D1 and D2 are selected to cover a desired distance range, which typically comprises all working distances of device 152.

In an image capture step 304, camera 32 captures an image of the projected spots.

In an analysis step 306, processing unit 36 analyzes the image. The analysis straightens the image and/or allows for the depth accuracy curve of the device, as necessary, to generate a reference image. The reference image is valid over all fields of view of device 152 and all working distances of the device, and is registered with respect to a frame of reference of the camera.

In a final step 308, the reference image is stored in memory 40, for use by processor 38 in 3D mapping of a test object.

Embodiments of the present invention may be combined to produce enhanced reference images. For example, if the projector in system 100 is configured to use coherent radiation, the secondary speckles introduced into system 100 may be eliminated using system 20. Similarly, secondary speckles may also be eliminated in systems 250 and 270 using system 20. It will thus be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. A method, comprising:

providing a device that projects a pattern;

capturing a reference image of the pattern using an image sensor by projecting the pattern onto a reference surface while at least a first part of the reference surface, containing a first portion of the pattern, is located at a first distance from the image sensor and while at least a second part of the reference surface, containing a second portion of the pattern, is located at a second distance, different from the first distance, from the image sensor, and combining the first and second portions of the pattern into the reference image;

registering the captured reference image in a frame of reference of the device;

storing the registered reference image in a memory associated with the device; and generating a three-dimensional (3D) map of an object, different from the reference surface, after storing the registered reference image by projecting the pattern onto the object, capturing a test image of the pattern on the object, and measuring local transverse shifts of the pattern in the test image relative to the reference image that is stored in the memory.

2. The method according to claim 1, wherein capturing the reference image comprises capturing a first image of the pattern projected onto the reference surface at the first distance using the image sensor, and capturing a second image of the pattern projected onto the reference surface at the second distance using the image sensor, and wherein registering the reference image comprises registering the first and second images to produce a registered reference image, and wherein storing the reference image comprises storing the registered reference image in the memory.

3. The method according to claim 1, wherein projecting the pattern comprises projecting the pattern into a first field of view, and wherein the image sensor has a second field of view different from the first field of view.

4. The method according to claim 1, wherein the reference surface is oriented with respect to the image sensor to have a first region of the reference surface at the first distance from the image sensor and to have a second region of the reference surface at the second distance, different from the first distance, from the image sensor.

5. The method according to claim 4, wherein the reference surface is planar and is oriented non-orthogonally with respect to an optical axis of the image sensor.

6. The method according to claim 4, wherein the reference surface is curved between the first distance and the second distance.

7. Apparatus, comprising:
   a projection and imaging device comprising:
      a projector that projects a pattern of radiation;
      an image sensor that captures images of a field of view on which the pattern is projected; and
      a memory, which is configured to store a reference image of the pattern,
      wherein the device is configured to generate a three-dimensional (3D) map of an object, after storing the reference image in the memory, by projecting the pattern onto the object, capturing a test image of the pattern on the object, and measuring local transverse shifts of the pattern in the test image relative to the reference image that is stored in the memory; and
   a system for generating the reference image, which comprises:
      a reference surface, which is different from the object that is to be mapped and is configured to enable the projection and imaging device to project the pattern onto the reference surface while at least a first part of the reference surface, containing a first portion of the pattern, is located at a first distance from the image sensor and while at least a second part of the reference surface, containing a second portion of the pattern, is located at a second distance, different from the first distance, from the image sensor; and
   a processor, which is configured to combine the first and second portions of the pattern into the reference image, to register the captured reference image in a frame of reference of the device, and to store the registered reference image in the memory of the device.

8. The apparatus according to claim 7, wherein the projector is configured to project the pattern into a first field of view, and wherein the field of view of the image sensor is a second field of view different from the first field of view.

9. The apparatus according to claim 7, wherein the reference surface is oriented with respect to the image sensor to have a first region of the reference surface at the first distance from the image sensor and to have a second region of the reference surface at the second distance, different from the first distance, from the image sensor.

10. The apparatus according to claim 9, wherein the reference surface is planar and is oriented non-orthogonally with respect to an optical axis of the image sensor.

11. The apparatus according to claim 9, wherein the reference surface is curved between the first distance and the second distance.

* * * * *